(12) United States Patent
Asada

(10) Patent No.: US 7,164,111 B2
(45) Date of Patent: Jan. 16, 2007

(54) DEVICE FOR DETECTING INVISIBLE LIGHT BEAM

(75) Inventor: Kenichi Asada, Osaka (JP)

(73) Assignee: Nippon Sheet Glass Company, Limited, Osaka (JP)

(*) Notice: Subject to any disclaimer, the term of this patent is extended or adjusted under 35 U.S.C. 154(b) by 245 days.

(21) Appl. No.: 10/813,795

(22) Filed: Mar. 31, 2004

(65) Prior Publication Data

US 2004/0196880 A1    Oct. 7, 2004

(30) Foreign Application Priority Data

Apr. 1, 2003  (JP)  ............................. 2003-098109

(51) Int. Cl.
 *G01J 1/44*  (2006.01)
 *H01J 40/14*  (2006.01)
(52) U.S. Cl. .................... 250/206; 250/234; 250/354.1
(58) Field of Classification Search ................ 250/206, 250/206.1–206.3, 338.1, 486.11, 487.1, 234–236; 398/135–139, 151
See application file for complete search history.

(56) References Cited

U.S. PATENT DOCUMENTS 3,757,125 A * 9/1973 Okada et al. ............... 250/202
5,467,194 A * 11/1995 Pellinen et al. ............. 356/429

FOREIGN PATENT DOCUMENTS

JP        06-236574        8/1994

* cited by examiner

*Primary Examiner*—Stephone B. Allen
*Assistant Examiner*—Patrick J. Lee
(74) *Attorney, Agent, or Firm*—Synnestvedt & Lechner LLP

(57) ABSTRACT

A light beam detection device includes a light-receiving element for receiving a light beam and outputting a detection signal. A light detection circuit generates and outputs a light-emission signal based on the detection signal. A light-emitting element emits light based on the light-emission signal. The light-receiving element and the light-emitting element are arranged on a detection member. A supporting member supports the detection member. A driving device moves the supporting member in a reciprocative manner in an X axis direction and a Y axis direction to form a detection region with the detection member. The light-emitting means forms an afterimage on the detection region when the light beam irradiates the detection region.

10 Claims, 5 Drawing Sheets

DEVICE FOR DETECTING INVISIBLE LIGHT BEAM

BACKGROUND OF THE INVENTION

The present invention relates to a light beam detection device.

The use of a laser light source as a light source for an optical signal used in optical communications is widely known in the prior art. In general, the light output from such laser light source is an invisible light (for example, infrared light) having a wavelength longer than that of visible light. Thus, even if the optical signal or the light transmitted with an optical fiber cable is discharged from one end of an optical fiber cable, the location of the optical path formed by the optical signal is not visual.

An optical element (for example, a diffraction grating, a mirror, and the like) used in an optical communication module is tested by irradiating an infrared light from one end of the optical fiber cable onto the optical element, which is arranged on a sample stage. The optical element is then evaluated based on the light reflected from the optical element. Thus, in order to properly irradiate the infrared light on the optical element, the optical path location of the infrared light needs to be detected and focused onto the optical element. The intensity of the infrared light generally irradiated as the light is maximum in a central portion of a spot of light and the intensity gradually decreases as the spot central portion becomes farther away and the edge of the spot becomes closer. The intensity distribution is referred to as a Gaussian distribution and has a shape similar to that of a normal distribution. When irradiating the infrared light onto the optical element, an effective spot diameter of the central portion of the infrared light must be recognized to perform irradiation at the maximum intensity.

A detector for detecting the infrared light used in such a task includes an IR card, an infrared CCD camera, an optical power meter and the like.

The IR card has, on a surface of the card, a light-emitting region applied with a substance that emits visible light in accordance with the intensity of the received infrared light. Therefore, the optical path location of the infrared light is detected by visibly recognizing the light-emitting region.

The infrared CCD camera directly receives the infrared light and displays the intensity thereof on a display. This enables the shape of the intensity distribution of the infrared light to be observed. Further, the optical path location is easily detected due to the high sensitivity.

The optical power meter receives the infrared light with a sensor portion including a light-receiving element and displays the intensity of the infrared light on a meter. The optical path location is detected by moving the sensor portion to detect the position where the displayed intensity becomes maximum (refer to, for example, Japanese Laid-Open Patent Publication No. 6-236574).

In Japanese Laid-Open Patent Publication No. 6-236574, a light-receiving element divided into four portions is used as the sensor portion. A differential output for every two of the divided portions is input to an X-axis and a Y-axis of a two-channel oscilloscope. Then, the optical path location of the infrared light is identified and the sensor portion is positioned by looking at the emission point appearing on the cathode-ray tube of the oscilloscope.

The IR card has low sensitivity and does not have an amplification function. Thus, the entire working environment must be darkened to detect infrared light that has very weak intensity. Therefore, after darkening the room and detecting the optical path location of the light, an additional task of lighting the room and adjusting the arrangement position of the optical element becomes necessary. This is burdensome. Furthermore, since the sensitivity of the IR card is low and the boundary between the light-emitting portion and the non-light-emitting portion is unclear, the size of the effective spot diameter of the light having a Gaussian distribution cannot be determined. With regard to the infrared CCD camera, the body thereof is large and is not suited for detecting the infrared light in a tight space.

In the optical power meter of Japanese Laid-Open Patent Publication No. 6-236574, when searching for the optical path location, the sensor portions are arranged while looking at a cathode-ray tube. This causes frequent movement of sight and requires a long time to detect the optical path location.

In the above mentioned IR card, the infrared CCD camera, and the optical power meter, after the optical path location is detected, the optical element subjected to testing must be rearranged with respect to the detected optical path location. Thus, it is difficult to accurately irradiate the infrared light onto the optical element.

SUMMARY OF THE INVENTION

Accordingly, it is an object of the present invention to provide a light beam detection device that detects the optical path location of not only visible light or invisible light but all types of lights.

To achieve the above object, the present invention provides a light beam detection device including a light-receiving means for receiving a light beam and outputting a detection signal. A light detection circuit generates and outputs a light-emission signal based on the detection signal. A light-emitting means emits light based on the light-emission signal. The light beam detection device further includes a detection portion on which the light-receiving means and the light-emitting means are arranged. A support supports the detection portion. A driving means moves the support in a reciprocative manner in an X axis direction and a Y axis direction to form a detection region with the detection portion. The light-emitting means forms an afterimage on the detection region when the light beam irradiates the detection region.

A further aspect of the present invention provides a light beam detection device including a light-receiving element for receiving a light beam and outputting a detection signal. A light detection circuit generates and outputs a light-emission signal based on the detection signal. A light-emitting element emits light based on the light-emission signal. The light beam detection device further includes a detection member on which the light-receiving element and the light-emitting element are arranged. A supporting member supports the detection member. A driving device moves the supporting member in a reciprocative manner in an X axis direction and a Y axis direction to form a detection region with the detection member. The light-emitting means forms an afterimage on the detection region when the light beam irradiates the detection region.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A light beam detection device according to the present invention embodied in an infrared detector will now be described with reference to FIGS. 1 to 7.

The infrared detector according of the preferred embodiment is used to detect invisible light, or infrared light having a wavelength longer than that of visible light.

Figure 1:
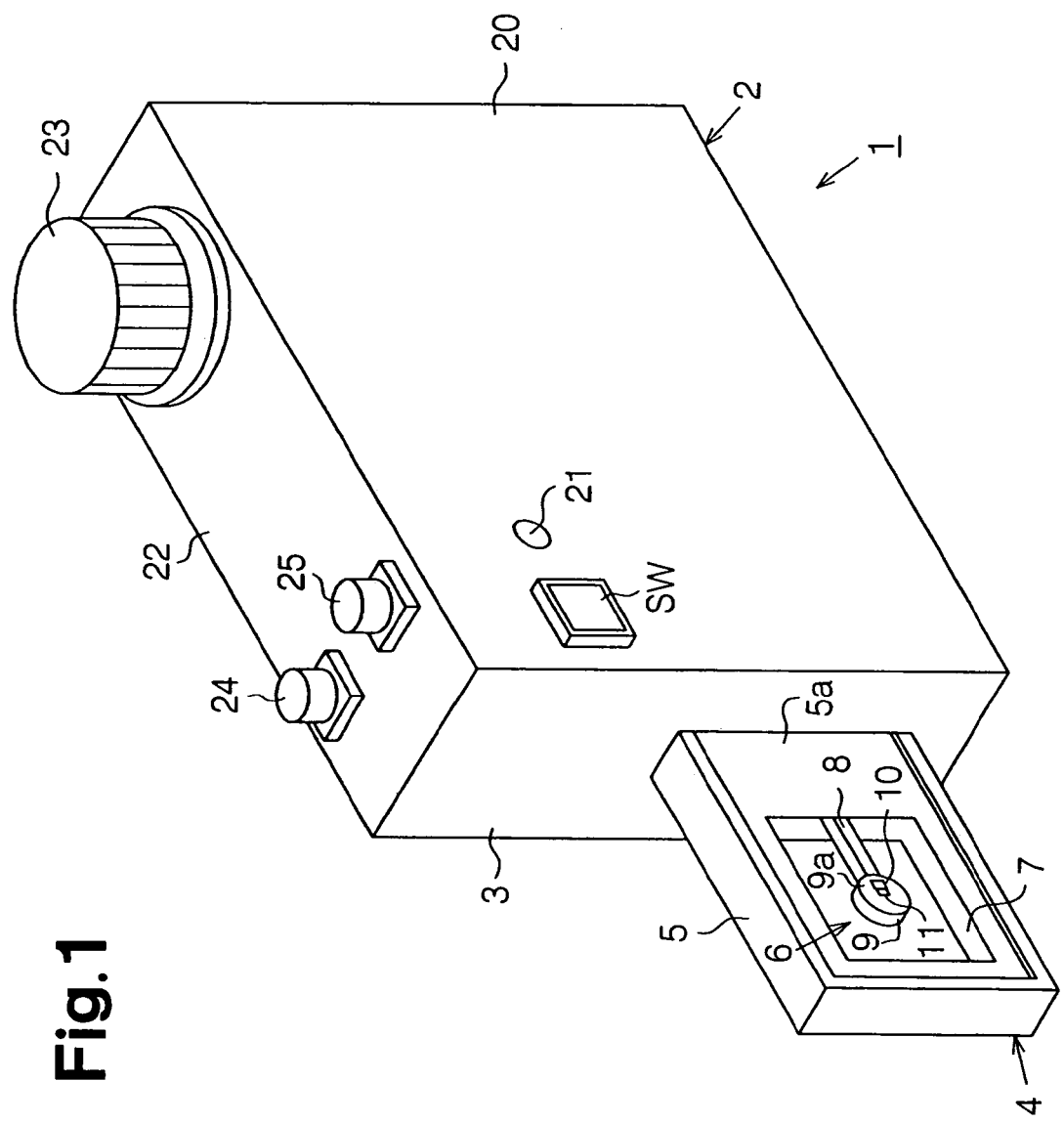
FIG. 1 is a perspective view showing an infrared detector according to a preferred embodiment of the present invention.

As shown in FIG. 1, an infrared detector 1 serving as the light beam detection device has a box-shaped case body 2, which is held by a person, and a sensor portion 4, which is projected from a side face 3 of the case body 2. The sensor portion 4 includes a protective case 5 and a detecting body 6, which projects from the case body 2 in the protective case 5. The protective case 5, which has a rectangular shape, and includes a detecting surface 5a with a square window 7 communicating with the inside of the protective case 5. The window 7 is fitted with, for example, a glass plate so that the inside of the window 7 is both sealed and visual.

The detecting body 6 has a square bar-shaped supporting rod 8, which serves as a support. The basal end of the supporting rod 8 is located in the case body 2, and the distal end is located in the protective case 5. A detection plate 9, which serves as a detection portion, is provided at the distal end of the supporting rod 8. The detection plate 9 is disc-shaped and has a detecting surface 9a facing the window 7 (the glass plate). A light-receiving element 10, which serves as a light-receiving means, and a light-emitting element 11, which serves as a light-emitting means, are fixed close together on the detecting surface 9a of the detection plate 9. The light-receiving element 10, which is formed by a photodiode in the preferred embodiment, receives an infrared beam entering the window 7 and converts the light into an electric signal (detection current Im). The light-emitting element 11, which is formed by a light-emitting diode (LED), emits light based on the electric signal (detection current Im) converted in the light-receiving element 10. The emitted light is output as test light from the window 7.

Figure 2:
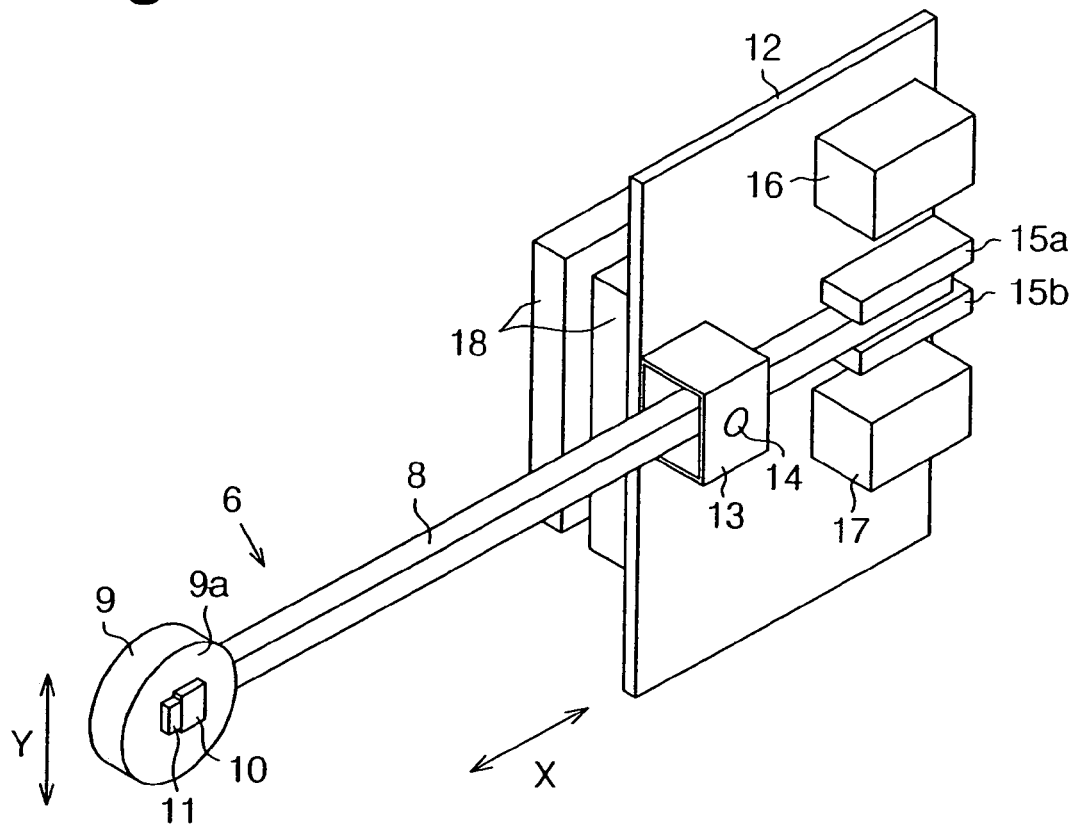
FIG. 2 is a perspective view showing the inner structure of the infrared detector in FIG. 1.

As shown in FIG. 2, a substrate 12 is arranged within the case body 2 and is movable in a reciprocating manner in the X axis direction. A damper 13 is arranged on the substrate 12. The supporting rod 8 is pivotally supported in the Y axis direction by a support pin 14 in the damper 13. Therefore, the detection plate 9 arranged at the distal end of the supporting rod 8 pivots in a reciprocating manner about the support pin 14 in the Y axis direction along a plane parallel to the plane of the window 7. The detection plate 9 also moves in a reciprocating manner in the X axis direction along the plane parallel to the plane of the window 7 when the substrate 12 moves in a reciprocating manner in the X axis direction. The square-shaped supporting rod 8 bends in the Y axis direction parallel to the plane of the window 7. Compared to a case in which the cross section of the supporting rod 8 is circular, the square cross section restricts bending. Therefore, the supporting rod 8 is stably pivoted in a reciprocating manner, and the detection plate 9 is stably moved in a reciprocating manner in the X axis direction and pivoted in a reciprocating manner in the Y axis direction.

Two permanent magnets 15a and 15b are fixed on the upper and lower sides of the basal end of the supporting rod 8. With regard to the upper permanent magnet 15a, the upper side surface (surface facing away from the surface fixed to the supporting rod 8) is the N pole. With regards to the lower permanent magnet 15b, the lower side surface (surface facing away from the surface fixed to the supporting rod 8) is the S pole. An electromagnet 16 and a vibration sensor 17, which serve as a Y axis direction driving means, are fixed so as to sandwich the basal end of the pivotal supporting rod 8. The electromagnet 16 changes the direction of the drive current Id flowing through the coil of the electromagnet 16 to change the magnetic pole of the side facing towards the permanent magnet 15a. The vibration sensor 17 detects the change in the magnetic field of the permanent magnet 15b caused by the reciprocative pivoting of the supporting rod 8 and outputs a detection signal If. A linear motor 18, which serves as an X axis direction driving means, is further arranged on the substrate 12. The linear motor 18 reciprocates the substrate 12 in the X axis direction. Therefore, the supporting rod 8 supported by the substrate 12 reciprocates in the X axis direction when the substrate 12 is reciprocated.

Figure 3:
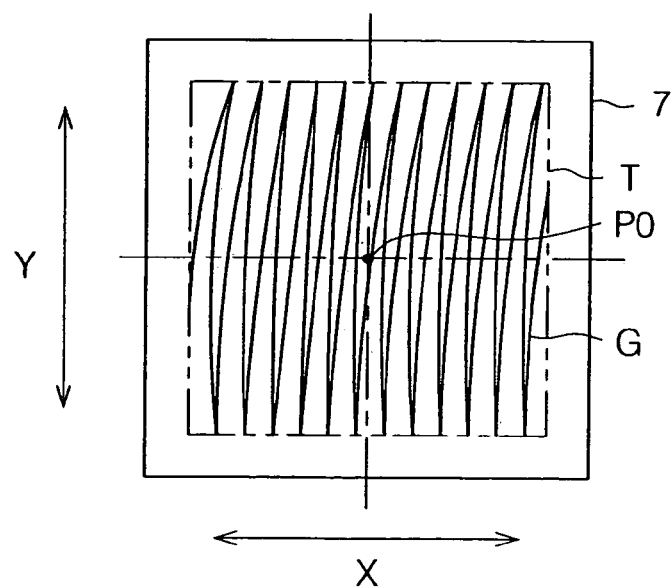
FIG. 3 is a plan view showing a detection region in the infrared detector of FIG. 1.

In the preferred embodiment, the supporting rod 8 is set to reciprocate in the Y axis direction while also reciprocating in the X axis direction. Further, the supporting rod 8 is set so that the reciprocating speed in the X axis direction is lower than the reciprocating speed in the Y axis direction. As shown in FIG. 3, the traveling trajectory G of the detection plate 9 supported by the supporting rod 8 moves in the X and Y axis directions without exiting out of the window 7 and forms a detection region T. In other words, the infrared beam entering the detection region T within the window 7 is detected by the light-receiving element 10 that moves within a range of the window 7. The optical path location and the optical path diameter of the infrared beam are displayed on the detection region T by the light from the light-emitting element 11 that moves in the window 7. Furthermore, as mentioned above, since the light-receiving element 10 and the light-emitting element 11 are arranged close together, the light-emitting element 11 emits light at substantially the same position as the position where the light-receiving element 10 receives the light. Therefore, there is no deviation between the optical path location of the infrared beam entering the light-receiving element 10 and the optical path location of the infrared beam displayed by the light from the light-emitting element 11. That is, the two optical path locations substantially coincide with one another.

The linear motor 18 of the preferred embodiment is a linear stepping motor. The detecting body 6 is thus positioned with high precision. In the infrared detector 1, the dimensions of the case body 2 are 80 millimeters×100 millimeters×30 millimeters, and the dimensions of the sensor portion 4 are 45 millimeters×35 millimeters×10 millimeters. Furthermore, the dimensions of the window 7 are 25 millimeters×25 millimeters.

A front surface 20 of the case body 2 includes a power switch SW and a light-emitting element 21, which is used to show the appropriate current. Furthermore, an upper surface 22 of the case body includes a display mode control knob 23, a start switch 24, and a reset switch 25.

The circuit configuration of the infrared detector 1 will now be explained.

Figure 4:
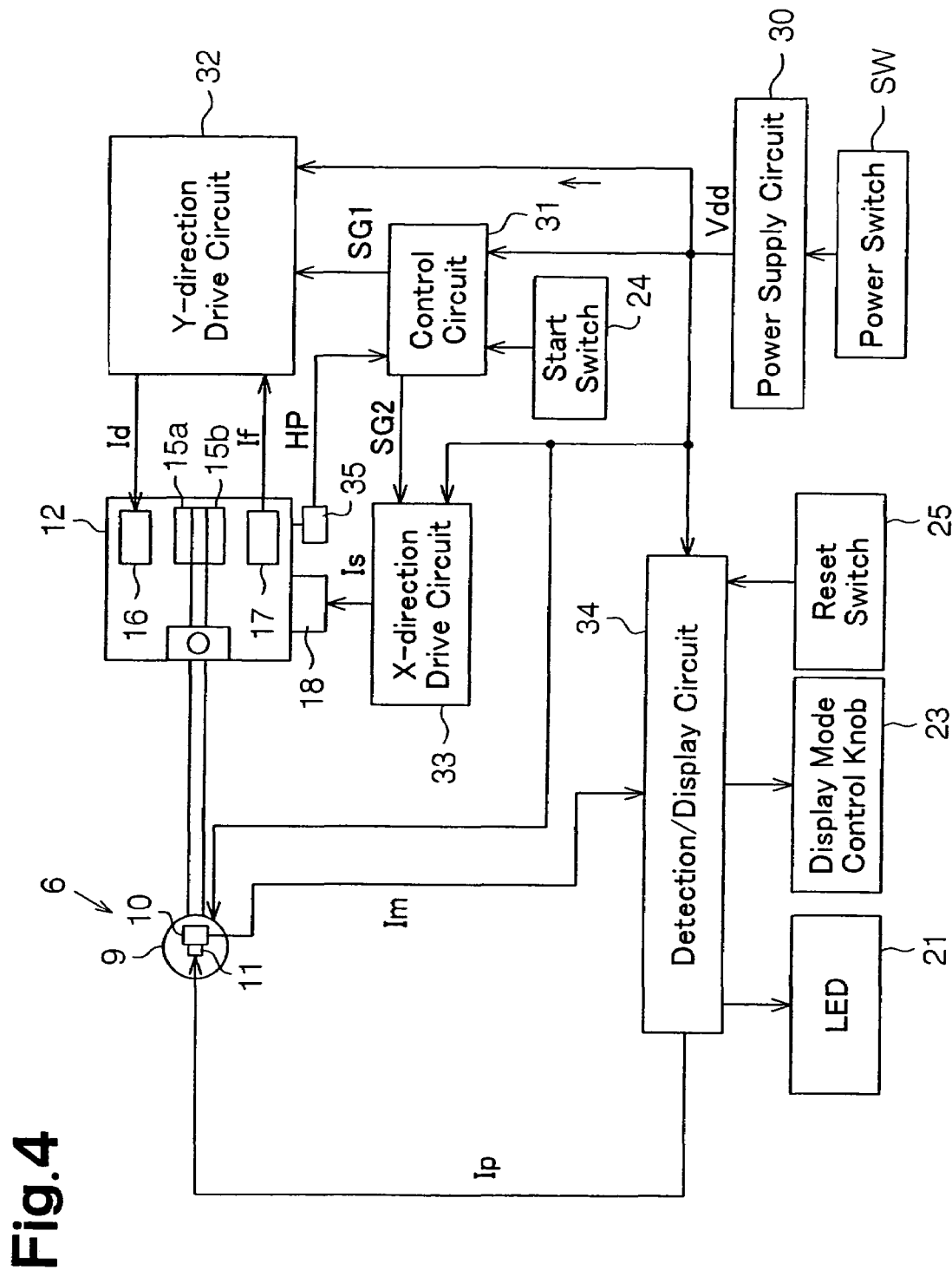
FIG. 4 is a block circuit diagram of the infrared detector of FIG. 1.

As shown in FIG. 4, the infrared detector 1 includes a power supply circuit 30, a control circuit 31, a Y-direction drive circuit 32, an X-direction drive circuit 33, a detection/display circuit 34, which serves as a light detection circuit, and a home position detection circuit 35.

The activation of the power switch SW starts the supply of drive voltage Vdd from the power supply circuit 30 to the control circuit 31, the Y-direction drive circuit 32, the X-direction drive circuit 33, and the detection/display circuit 34. The inactivation of the power switch SW stops the supply of the drive voltage Vdd to the control circuit 31, the Y-direction drive circuit 32, the X-direction drive circuit 33, and the detection/display circuit 34. The circuits 31 to 34 are activated when the drive voltage Vdd is supplied from the power supply circuit 30 and inactivated when the supply of the drive voltage Vdd from the power supply circuit 30 is stopped.

The control circuit 31 is a circuit for drive controlling the Y-direction drive circuit 32 and the X-direction drive circuit 33. The control circuit 31 outputs, in a standby mode, a first drive control signal SG1 to the Y-direction drive circuit 32 and a second drive control signal SG2 to the X-direction drive circuit 33 in response to the operation of the start switch 24. The control circuit 31 is selectively set to the standby mode or one of four modes, the first mode to the fourth mode, based on the number of times the start switch 24 is operated. More specifically, when the activation of the power switch SW supplies the control circuit 31 with drive voltage Vdd from the power supply circuit 30, the control circuit 31 is set to the standby mode. The control circuit 31 is then sequentially switched to each mode in the order of first mode→second mode→third mode→fourth mode→standby mode→first mode→second mode each time the start switch 24 is operated.

The standby mode is a mode for holding the detecting body 6 in a stationary state. The first to the fourth mode are modes for selectively setting the display resolution. The display resolution increases from the first mode to the fourth mode.

The vibration frequency and the vibration width in the Y axis direction of the detecting body 6 is set to be constant in all four modes, and the movement speed in the X axis direction and thus the vibration width in the X axis direction are changed for each mode. This determines the display resolution. In the preferred embodiment, the display resolution is determined by decreasing the movement speed in the X axis direction and narrowing the vibration width in the X axis direction as the modes sequentially change from the first mode to the fourth mode.

In the preferred embodiment, the movement time in the X axis direction (time required for one-way movement in the reciprocating motion of the linear motor 18) and the vibration width and number of steps (number of steps required in the one-way movement of the linear motor 18) in the X axis direction is as follows.

In the first mode, the movement time is 0.18 seconds, the vibration width is 15 millimeters, and the number of steps is 80 steps.

In the second mode, the movement time is 0.19 seconds, the vibration width is 11.3 millimeters, and the number of steps is 60 steps.

In the third mode, the movement time is 0.166 seconds, the vibration width is 7.5 millimeters, and the number of steps is 40 steps.

In the fourth mode, the movement time is 0.102 seconds, the vibration width is 3.8 millimeters, and the number of steps is 20 steps.

In the detection region T shown in FIG. 3, the detection width in the Y axis direction is constant (20 millimeters) and the detection width in the X axis direction varies within a range of 15 millimeters to 3.8 millimeters. The control circuit 31 outputs the first drive control signal SG1 and the second drive control signal SG2 to the Y-direction drive circuit 32 and the X-direction drive circuit 33, respectively, based on the mode set according to the operation of the start switch 24.

A home position detection signal HP from the home position detection circuit 35 is provided to the control circuit 31. The home position detection circuit 35 includes a photocoupler for detecting whether or not the light-receiving element 10 on the detection plate 9 is at a predetermined position of the detection region T. In the preferred embodiment, the home position detection circuit 35 detects the position of the substrate 12 that is reciprocated in the X axis direction by the linear motor 18. The home position detection circuit 35 detects the relative position of the substrate 12 when the light-receiving element 10 is located at a central position PO of the detection region T, and outputs the home position detection signal HP to the control circuit 31. When receiving the home position detection signal HP, the control circuit 31 determines that the light-receiving element 10 is located at the central position PO of the detection region T.

The Y-direction drive circuit 32 supplies the drive current Id to the electromagnet 16 in response to the first drive control signal SG1 provided from the control circuit 31. The Y-direction drive circuit 32 stops supplying the drive current Id to the electromagnet 16 when the first drive control signal SG1 provided from the control circuit 31 is based on the standby mode. The Y-direction drive circuit 32 supplies the drive current Id to the electromagnet 16 when the first drive control signal SG1 provided from the control circuit 31 is based on one of the four modes.

The drive current Id is an alternating current and switches the excitation of the electromagnet 16 to determine the frequency and the vibration width in the Y axis direction. In the preferred embodiment, since the vibration frequency and the vibration width in the Y axis direction is constant in all of the modes, the Y-direction drive circuit 32 does not depend on the first drive control signal SG1 that is based on the first mode to the fourth mode, and always outputs the drive current Id for maintaining the predetermined vibration frequency and vibration width in the Y axis direction.

The vibration sensor 17 inputs a detection signal If to the Y-direction drive circuit 32. The Y-direction drive circuit 32 calculates the actual vibration frequency of the detection plate 9 in the Y axis direction at certain points based on the detection signal If. Then, the Y-direction drive circuit 32 compares the calculated actual frequency in the Y axis direction and a predetermined vibration frequency in the Y axis direction. If the actual frequency in the Y axis direction deviates from the predetermined vibration frequency in the Y axis direction, the Y-direction drive circuit 32 corrects the frequency of the drive current Id and supplies current to the electromagnet 16 so that the actual vibration frequency in the Y axis direction coincides with the predetermined vibration frequency in the Y axis direction.

The X-direction drive circuit 33 outputs a drive signal to the linear motor 18 in response to the second drive control signal SG2 from the control circuit 31. When the X-direction drive circuit 33 receives the second drive control signal SG2 that is based on the standby mode from the control circuit 31, the X-direction drive circuit 33 stops the linear motor 18 so that the light-receiving element 10 is stationed at the central position PO of the detection region T. The X-direction drive circuit 33 stops the linear motor 18 when it receives a signal from the control circuit 31 indicating that the light-receiving element 10 is located at the central position PO based on the home position detection signal HP from the home position detection circuit 35. Therefore, during the standby mode, the X-direction drive circuit 33 drives the linear motor 18 until the light-receiving element 10 is positioned at the central position PO.

When the second drive control signal SG2 based on the first to fourth modes is provided from the control circuit 31, the X-direction drive circuit 33 provides the drive signal Is to the linear motor 18. The drive signal Is is a drive signal that reciprocates the linear motor 18 in the X axis direction at a predetermined speed within a predetermined movement range. In the preferred embodiment, the X-direction drive circuit 33 changes the value of the drive signal Is for each of the first to fourth modes. The X-direction drive circuit 33 drive controls the linear motor 18 so that in the first mode, the movement time is 0.18 seconds, the vibration width is 15 millimeters, and the number of steps is 80 steps; and in the second mode, the movement time is 0.19 seconds, the vibration width is 11.3 millimeters, and the number of steps is 60 steps, as mentioned above.

Furthermore, the X-direction drive circuit 33 drive controls the linear motor 18 so that in the third mode, the movement time is 0.166 seconds, the vibration width is 7.5 millimeters, and the number of steps is 40 steps; and in the fourth mode, the movement time is 0.102 seconds, the vibration width is 3.8 millimeters, and the number of steps is 20 steps.

The detection/display circuit 34 is connected to the light-receiving element 10 and the light-emitting element 11. The detection/display circuit 34 receives the detection current Im output from the light-receiving element 10 when the light-receiving element 10 receives the infrared beam. After the detection current Im is input, the detection/display circuit 34 converts the detection current Im to a drive current Ip in a drive amplifier inside the detection/display circuit 34. The detection/display circuit 34 then supplies the drive current Ip to the light-emitting element 11. The detection/display circuit 34 causes the light-emitting element 11 arranged in the vicinity of the light-receiving element 10 to emit light when the light-receiving element 10 receives the infrared beam.

Figure 5:
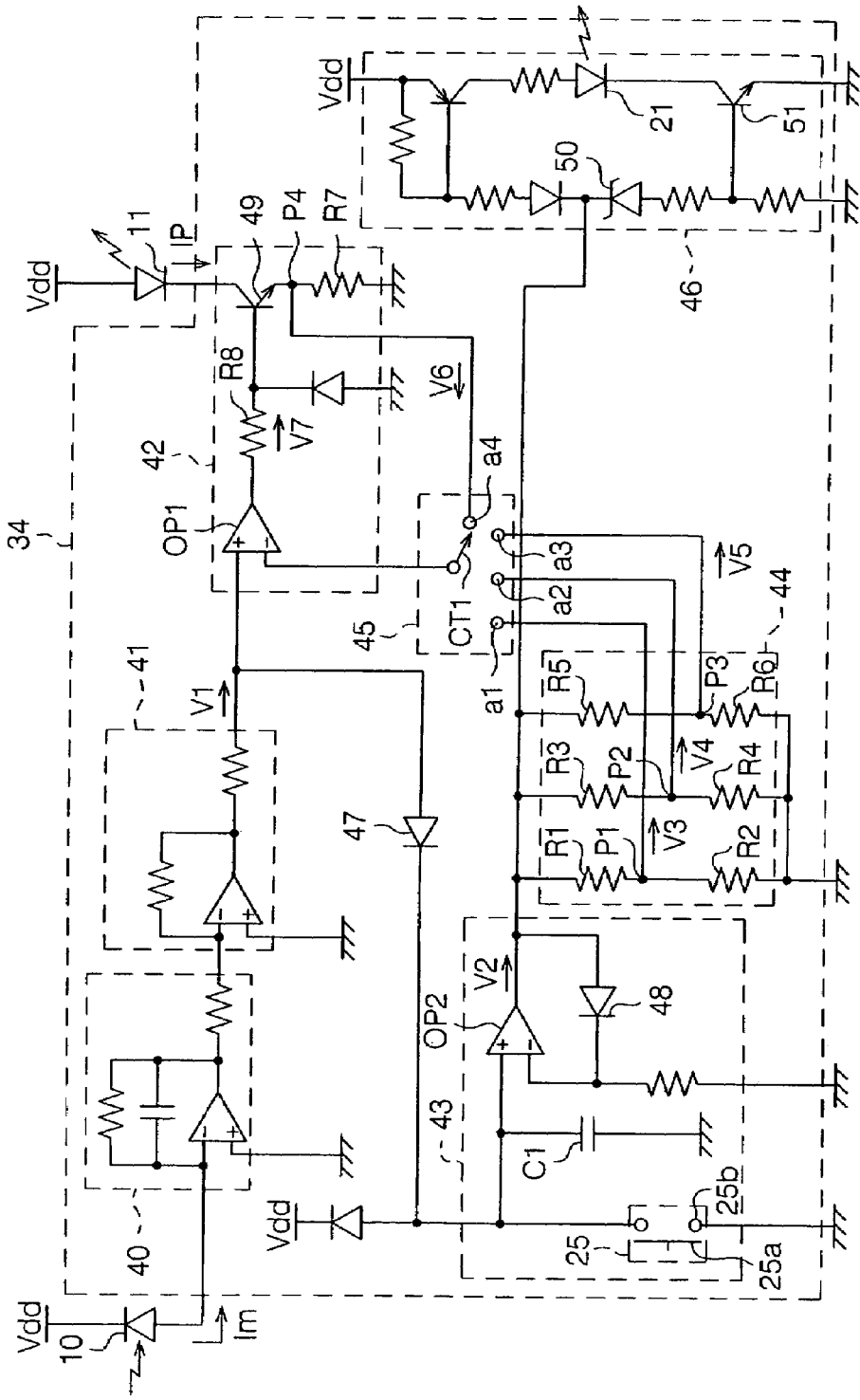
FIG. 5 is a circuit diagram showing a detection/display circuit in the infrared detector of FIG. 1.

The details of the operation of the detection/display circuit 34 will now be explained with reference to FIG. 5. As shown in FIG. 5, the detection/display circuit 34 includes a current-voltage conversion circuit 40 (hereinafter referred to as I/V conversion circuit 40), a buffer inversion circuit 41, an LED drive circuit 42, a peak hold circuit 43, a reference voltage setting circuit 44, a connecting circuit 45, and an appropriate current display circuit 46. The detection/display circuit 34 is connected to the light-receiving element 10 and the light-emitting element 11, as mentioned above.

The detection current Im converted by the light-receiving element 10 is converted to data voltage having negative polarity in the I/V conversion circuit 40 and is then converted to data voltage V1 having positive polarity in the buffer inversion circuit 41. The data voltage V1 output from the buffer inversion circuit 41 is input to a positive input terminal of an operational amplifier OP1 of the LED drive circuit 42 as a comparison voltage.

The data voltage V1 from the buffer inversion circuit 41 is also input to a positive input terminal of an operational amplifier OP2 of the peak hold circuit 43 via a diode 47. The data voltage V1, input to the operational amplifier OP2 of the peak hold circuit 43, is output from an output terminal of the operational amplifier OP2 to the reference voltage setting circuit 44 as data voltage V2. A diode 48 is connected between the output terminal and the negative input terminal of the operational amplifier OP2. The data voltage V1 charges a capacitor C1 connected between the positive input terminal of the operational amplifier OP2 and ground. The data voltage V1 in the capacitor C1 is updated whenever the data voltage V1 of a higher level is input and held as peak voltage. As a result, the peak voltage of the data voltage V1 is supplied to the positive input terminal of the operational amplifier OP2. The data voltage V1 in the capacitor C1 held as the peak voltage is discharged and reset to zero volts when the reset switch 25 is activated to connect a movable terminal 25*a* and a fixed terminal 25*b* of the reset switch 25.

The data voltage V2 output from the operational amplifier OP2 is applied to a first voltage dividing circuit, a second voltage dividing circuit, and a third voltage dividing circuit that configure the reference voltage setting circuit 44. The first voltage dividing circuit includes a series-connected circuit configured by a resistor R1 and a resistor R2. The ratio of the electrical resistance of the resistors R1 and R2 is set to be 20:3.3. The data voltage V2 input to the first voltage divider is voltage divided and output, as a data voltage V3 serving as reference voltage, to the negative input terminal of the operational amplifier OP1 in the LED drive circuit 42 via a connecting circuit 45 from a node P1 of the resistor R1 and the resistor R2. The value of the data voltage V3 in this state is $1/e^2$ if the value of the peak voltage of the data voltage V1 held in the capacitor C1 is 1. The letter e represents the base of a natural logarithm and is approximately 2.718.

The second voltage dividing circuit includes a series-connected circuit configured by a resistor R3 and a resistor R4. The ratio of the electrical resistance of the resistors R3 and R4 is set to be 1:1. The data voltage V2 input to the second voltage divider is voltage divided and output, as data voltage V4 serving as reference voltage, to the negative input terminal of the operational amplifier OP1 of the LED drive circuit 42 via a connecting circuit 45 from a node P2 of the resistor R3 and the resistor R4. The value of the data voltage V4 in this state is −3 dB if the value of the peak voltage of the data voltage V1 held in the capacitor C1 is 1.

The third voltage dividing circuit includes a series circuit of a resistor R5 and a resistor R6. The ratio of the electrical resistance of the resistors R5 and R6 is set to be 10:39. The data voltage V2 input to the third voltage divider is voltage divided and output, as data voltage V5 serving as a reference voltage, to the negative input terminal of the operational amplifier OP1 of the LED drive circuit 42 from the node P3 of the resistor R5 and the resistor R6 via a connecting circuit 45. The value of the data voltage V5 is −1 dB if the value of the peak voltage of the data voltage V1 held in the capacitor C1 is 1.

Data voltage V6 serving as a reference voltage is also input to the negative input terminal of the operational amplifier OP1 from a node P4 of an emitter of the transistor 49 and a resistor R7 of the LED drive circuit 42 via the connecting circuit 45. The data voltage V6 is determined by the voltage between the terminals of the resistor R7.

The connecting circuit 45 includes a movable terminal CT1 and first, second, third, and fourth fixed terminals a1 to a4. The movable terminal CT1 is connected to the negative input terminal of the operational amplifier OP1 and to one of the first to fourth fixed terminals a1 to a4 by switching, or turning, the display control knob 23. The four fixed terminals a1 to a4 are each connected to the corresponding one of the nodes P1 to P4. For example, when the movable terminal CT1 and the first fixed terminal a1 are connected by turning the display mode control knob 23, the data voltage V3 is input to the negative input terminal of the operational amplifier OP1. If the movable terminal CT1 and the second fixed terminal a2 are connected, the data voltage V4 is input to the negative input terminal of the operational amplifier OP1. If the movable terminal CT1 and the third fixed terminal a3 are connected, the data voltage V5 is input to the negative input terminal of the operational amplifier OP1. If the movable terminal CT1 and the fourth fixed terminal a4 are connected, the data voltage V6 is input to the negative input terminal of the operational amplifier OP1.

The operational amplifier OP1 compares the data voltage V1 input to the positive input terminal with the data voltage selected from the data voltages V3 to V5 at the connecting circuit 45, and outputs the comparison result in the form of binary data voltage V7 to the base terminal of the transistor 49 via the resistor R8.

More specifically, if the data voltage V1 has a higher level value than the voltage selected from the data voltages V3 to V5, the data voltage V7 having a high level is output from the operational amplifier OP1. If the data voltage V1 has a low level value, the data voltage V7 having a low level is output from the operational amplifier OP1. When the high data voltage V7 is applied to the base terminal of the transistor 49, the transistor 49 becomes conductive. When the low data voltage V7 is applied, the transistor 49 becomes non-conductive.

When the transistor 49 is conductive, the drive current Ip is supplied to the light-emitting element 11 connected to the emitter of the transistor 49. When the transistor 49 is non-conductive, the supply of the drive current Ip to the light-emitting element 11 is cut-off. Therefore, if, for example, the detection current Im is input from the light-receiving element 10 and the data voltage V1 of 10 volts is generated as a result, the data voltage V1 is input to the positive input terminal of the operational amplifier OP1 and at the same time held in the capacitor 1. The data voltage V1 of 10 volts held in the capacitor C1 is input to the operational amplifier OP2 as the peak voltage. If, for example, the movable terminal CT1 of the display control knob 23 is connected to the second fixed terminal a2, the data voltage V4 of 5 volts is input to the negative input terminal of the operational amplifier OP1 as the reference voltage via the node P2. The data voltage V1 of 10 volts is then compared with the data voltage V4 of 5 volts.

The high data voltage V7 is then output from the output terminal of the operational amplifier OP1 to the base terminal of the transistor 49. Accordingly, the transistor 49 then becomes conductive and the light-emitting element 11 supplied with the drive current Ip emits light. Since the peak voltage (10 volts) of the data voltage V1 is held in the capacitor C1, the data voltage V4 maintains a voltage value of 5 volts. Thus, even if the detection current Im decrease and lowers the voltage level of the data voltage V1, the data voltage V4 of 5 volts is used as a reference voltage for comparison in the operational amplifier OP1.

Therefore, if the voltage value of the data voltage V1 input to the positive input terminal is above 5 volts, the H level data voltage V7 is output from the operational amplifier OP1. If the voltage value of the data voltage V1 is 5 volts or lower, the low data voltage V7 is output from the operational amplifier OP1. The transistor 49 accordingly becomes either conductive or non-conductive. Thus, the light-emitting element 11 either emits light or does not emit light. When the data voltage V1 of 10 volts is held in the capacitor C1, and the movable terminal CT1 and the second fixed terminal a2 are connected by operating the display mode control knob 23, the light-emitting element 11 emits light only for an infrared beam having a light intensity that can be converted to the data voltage V1 of 5 volts or greater. In the detection region T, the optical path location and the optical path diameter of the infrared beam having a light intensity that can be converted to the data voltage V1 of 5 volts or greater is displayed.

When the movable terminal CT1 of the knob 23 and the fourth fixed terminal a4 are connected by operating the display mode control knob 23, the data voltage V6 is output from the node P4 to the negative input terminal of the operational amplifier OP1. The conducting state of the transistor 49 is controlled by the data voltage V7 output from the output terminal of the operational amplifier OP1, and the drive current Ip is determined accordingly. The voltage level of the data voltage V6 is determined according to the drive current Ip and the electrical resistance value of the resistor R7. Therefore, the data voltage V6 based on the data voltage V7 output from the output terminal is fed back to the negative input terminal of the operational amplifier OP1. The operational amplifier OP1 outputs the data voltage V7 based on the voltage level of the data voltage V. Thus, the light-emitting element 11 emits light in accordance with the intensity of the infrared beam received by the light-receiving element 10. In the detection region T, the optical path and the optical path location are displayed with a brightness corresponding to the intensity distribution of the infrared beam.

As described above, by turning the display mode control knob 23, the connection between the movable terminal CT1 and the fixed terminals a1 to a4 of the connecting circuit 45 is changed. This enables the intensity range for detecting the infrared beam to be selected from four levels. With the turning of the display mode control knob 23, the optical path and the optical path diameter of the infrared beam displayed on the detection region T is changed between four levels. In the preferred embodiment, the first display level is when the movable terminal CT1 is connected to the first fixed terminal a1, and the second display level is when the movable terminal CT1 is connected to the second fixed terminal a2. Moreover, the third display level is when the movable terminal CT1 is connected to the third fixed terminal a3, and the fourth display level is when the movable terminal CT1 is connected to the fourth fixed terminal a4.

In the first display level, the effective spot diameter of the infrared beam is displayed. In an infrared beam generally having a Gaussian distribution, the intensity is $1/e^2$ where the radius is minimum (Gaussian beam radius). In the first display level of the preferred embodiment, the infrared beam having an intensity greater than or equal to $1/e^2$ is detected using the first voltage dividing circuit in which the data voltage V3 is set to be $1/e^2$ with respect to the peak voltage. The optical path diameter displayed in the detection region T is thus the effective spot diameter of the infrared beam. By setting the data voltage V4 to −3 dB at the second display level and the data voltage V5 to −1 dB at the third display level, a very weak infrared beam that is not detectable by a conventional IR card can be displayed on the detection region T to be visually recognized.

The data voltage V2 output from the operational amplifier OP2 of the peak hold circuit 43 is also applied to a Zener diode 50 of the appropriate current display circuit 46. If the applied data voltage V2 exceeds a predetermined voltage level, the Zener diode 50 yields and the data voltage V2 is applied to the base of the transistor 51. The transistor 51 accordingly becomes conductive. Thus, the drive current is supplied to the light-emitting element 21 for the appropriate current display, and the light-emitting element 21 emits light. If the data voltage V2 does not exceed the predetermined voltage level, the Zener diode does not yield. In this case, the transistor 51 is non-conductive. Thus, the supply of the drive current to the light-emitting element 21 is cut-off, and the light-emitting element 21 does not emit light. The predetermined voltage level is the voltage level that drives the LED drive current circuit 42. In the appropriate current display circuit 46, by causing light-emission or stopping light-emission of the light-emitting element 21, a data voltage V2 greater than or equal to the predetermined voltage level is output from the operational amplifier OP2 for notification that the LED drive circuit 42 is in a drivable state.

A method for detecting the optical path location of the infrared beam using the infrared detector 1 and irradiating the infrared beam to a sample will now be described with reference to FIG. 6 and FIG. 7.

Figure 6:
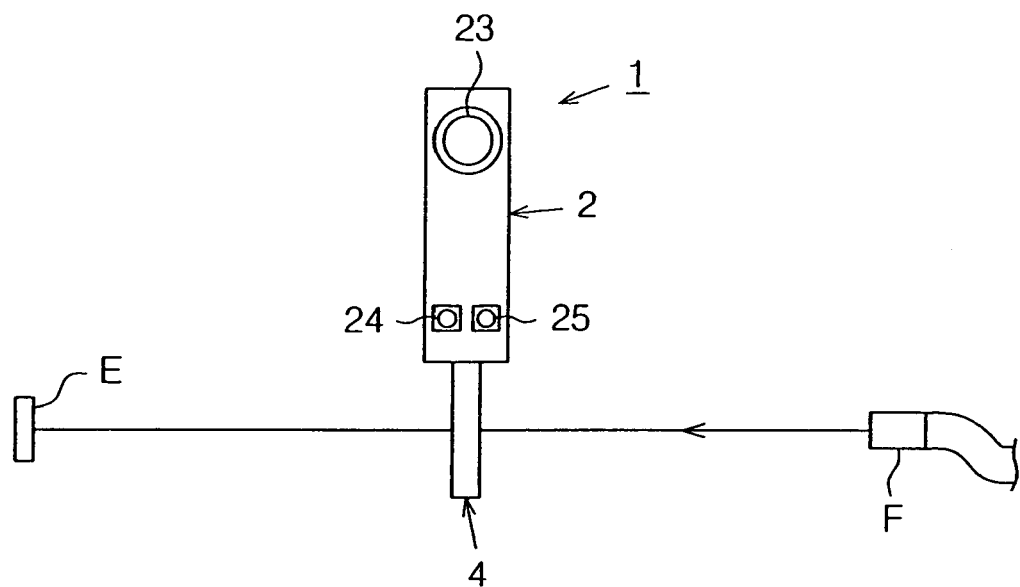
FIG. 6 is a plan view showing an arrangement for the infrared detector, a sample, and an optical fiber cable.
Figure 7:
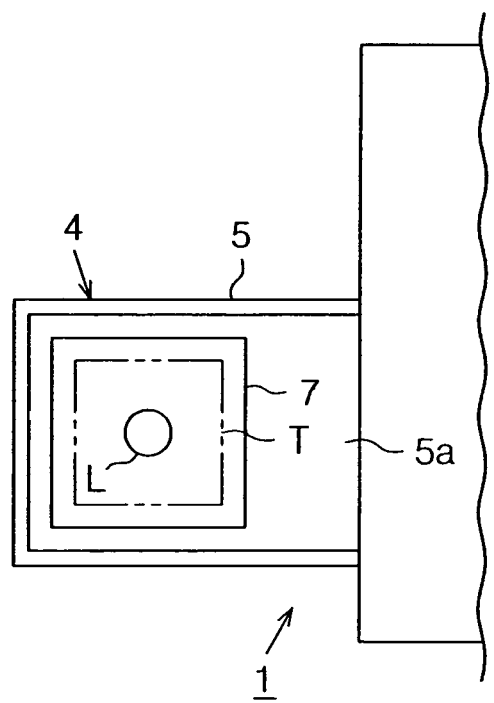
FIG. 7 is a plan view illustrating the operation of the infrared detector in FIG. 1.

As shown in FIG. 6, an end on an output side of the optical fiber cable F is arranged facing towards sample E. The optical fiber cable F is a cable that outputs an infrared beam supplied from a luminescent device (not shown). The infrared beam output from the optical fiber cable is then irradiated onto the sample E.

First, the infrared beam from the optical fiber cable F irradiates the sample E. The power supply switch SW of the infrared detector 1 is turned ON to activate the infrared detector 1. In this state, the infrared detector 1 is in the standby mode. Next, after the reset switch 25 is activated and the capacitor C1 in the detection/display circuit 34 is reset to zero volts, the start switch 24 is operated to move the detection plate 9 in the X axis direction and in the Y axis direction in the first mode to form the detection region T. The detection width in the Y axis direction of the detection region T is 20 millimeters and the detection width in the X axis direction is 15 millimeters.

The detecting body 6 of the infrared detector 1 is arranged between the sample E and the optical fiber cable F so that the infrared beam irradiates the window 7 of the detecting body 6. As a result, as shown in FIG. 7, in the detection region T formed in the window 7, an afterimage L of the light emitted by the light-emitting element 11 is formed in the region irradiated by the infrared beam. The brightness as well as the emission intensity range of the light-emitting element 11 is selected from the first to fourth display levels with the display mode control knob 23 to clearly display the afterimage L. The start switch 24 is then operated to set the second mode. In this state, the detection width in the Y axis direction of the detection region T is 20 millimeters, and the detection width in the X axis direction is 11.3 millimeters. Although the detection region T is narrowed, the movement time (one-way) in the X axis direction of the detection plate 9 is 0.18 seconds in the first mode and 0.19 seconds in the second mode. Thus, considering the vibration width in the X axis direction, the display resolution increases. By successively operating the start switch 24 and switching to the third mode and the fourth mode, the afterimage L becomes more detailed.

The optical path location and the optical path diameter of the infrared beam irradiated from the optical fiber cable F are confirmed by looking at the afterimage L formed on the window 7.

The positions of the optical fiber cable F and the sample E are adjusted by looking at the afterimage L of the infrared detector 1 so that the sample E seen through the window 7 overlaps the afterimage L. A position where the afterimage L and the sample E overlap is the position where the infrared beam irradiated from the optical fiber cable F accurately irradiates the sample E. When the case body 2 of the infrared detector 1 is moved away from the optical fiber cable F, the intensity of the infrared beam irradiated from the optical fiber cable F to the window 7 of the detecting body 6 attenuates. The data voltage V1 based on the detection current Im newly output from the light-receiving element 10 has low intensity with respect to the peak voltage of the data voltage V1 held in the capacitor C1. Thus, the afterimage L cannot be easily formed on the detection region T. In such a case, the reset switch 25 of the case body 2 is activated to reset the data voltage V1 held in the capacitor C1 to zero volts so that the capacitor C1 holds the new peak voltage. Thus, the afterimage L is formed again in the detection region T with high precision.

The above embodiment of the present invention has the following advantages.

(1) In the preferred embodiment, the light-emitting element 11 emits light in accordance with the intensity of the infrared beam received by the light-receiving element 10. The detection plate 9, on which the light-receiving element 10 and the light-emitting element 11 are arranged close to each other, moves in the X axis direction and the Y axis direction to form the detection region T. When the infrared beam irradiates the window 7, the light-emitting element 11 emits light at substantially the same position as where the light-receiving element 10 receives light. The afterimage L is then formed in the detection region T at substantially the same position as the optical path location of the infrared beam. The optical path location of the infrared beam, which is invisible light, is detected by looking at the afterimage L. Furthermore, the size of the optical path diameter of the infrared beam output from the optical fiber cable F is visual.

(2) In the preferred embodiment, the peak voltage of the data voltage V1 is held in the capacitor C1, and one of the data voltages V3 to V5 based on the held data voltage V1 is input to the negative input terminal of the operational amplifier OP1 by operating the display mode control knob 23. In the operational amplifier OP1, one of the data voltages V3 to V5 input to the negative input terminal of the operational amplifier OP1 is compared with the data voltage V1 based on the detection current Im input from the light-receiving element 10. Then, high data voltage V7 or low data voltage V7 is output to the transistor 49. The transistor 49 becomes conductive if the high data voltage V7 is supplied and becomes non-conductive if the L level data voltage V7 is supplied. The light-emitting element 11 accordingly either emits light or does not emit light. As a result, the peak voltage corresponding to the maximum intensity of the irradiated infrared beam is held. This causes the operational amplifier OP1 to perform a comparison. Thus, the optical path diameter and the optical path location of the infrared beam having the highest intensity is displayed. The intensity range of the detected infrared beam is selected by operating the display mode control knob 23 and switching the data voltages V3 to V5 input to the operational amplifier OP1.

(3) In the preferred embodiment, the window 7 is formed, and the detection plate 9 is moved in the X axis direction and the Y axis direction. A target is visible through the window 7. This facilitates the positional adjustment of the optical fiber cable F and the target. As a result, the infrared beam is accurately irradiated from the optical fiber cable F to the target.

(4) In the preferred embodiment, the infrared detector 1 has the first to fourth modes. The afterimage L may thus be displayed on the detection region T with the required display resolution.

(5) In the preferred embodiment, the dimensions of the sensor portion 4 are 45 millimeters×35 millimeters×10 millimeters. Therefore, the sensor portion 4 can be placed in a narrow gap. This facilitates detection of the infrared beam in a narrow place where detection would be difficult with a conventional infrared camera.

(6) In the preferred embodiment, the dimensions of the case body 2 are 80 millimeters×100 millimeters×30 millimeters. Therefore, the infrared detector 1 can be held with one hand, and the other hand can be used to position the sample E or the optical fiber cable F. The detection and irradiation of the infrared beam may thus be performed quickly.

It should be apparent to those skilled in the art that the present invention may be embodied in many other specific forms without departing from the spirit or scope of the invention. Particularly, it should be understood that the invention may be embodied in the following forms.

In the preferred embodiment, the light beam detection device is embodied in the infrared detector 1. However, the application of the present invention is not limited to a light beam detection device that detects invisible light but may also be applied to a light beam detection device that detects visible light.

The light-receiving element 10 and the light-emitting element 11 may be configured as a single chip set. Further, the light-receiving element 10 and the light-emitting element 11 may be arranged at the same position on the detecting surface 5a by using for example, a beam splitter.

The detection plate 9 is driven based on the first to fourth modes in the preferred embodiment. However, any driving methods or driving ranges may be used as long as the necessary vibration widths in the X axis direction and the Y axis direction are obtained.

The light beam detection device is embodied in the infrared detector 1 to display the optical path location in the preferred embodiment. However, the infrared detector 1 may also be connected to an optical power meter and be used as a light-receiving portion of the optical power meter.

The first to fourth modes vary the vibration widths in the X axis direction of the linear motor 18 and in the X axis direction of the detection plate 9 in the preferred embodiment. However, the vibration width in the X axis direction and the Y axis direction may be fixed. Furthermore, although the vibration width in the Y axis direction of the detection plate 9 is fixed in the preferred embodiment, the vibration width in the Y axis may be variable.

The light-emitting element 11 is arranged on the front surface (detecting surface 9a) of the detection plate 9 in the preferred embodiment. However, the light-emitting element 11 may also be arranged on both front and rear surfaces of the detection plate 9. In such a case, the luminescent color of the light-emitting element 11 may differ between the front and rear surfaces.

In the preferred embodiment, the detection/display circuit 34 includes the I/V conversion circuit 40, the buffer inversion circuit 41, the LED drive circuit 42, the peak hold circuit 43, the reference voltage setting circuit 44, the connecting circuit 45, and the appropriate current display circuit 46. Such circuit devices 40 to 46 may be integrated into one IC chip. Furthermore, a memory region may be provided so that the memory region is programmable to perform resetting of the peak voltage when necessary.

Therefore, the present examples and embodiment are to be considered as illustrative and not restrictive and the invention is not to be limited to the details given herein, but may be modified within the scope and equivalence of the appended claims.

What is claimed is:

1. A light beam detection device that receives invisible light and emits visible light in response to the received invisible light, the device comprising:
    a light-receiving means for receiving an invisible light beam and outputting a detection signal;
    a light detection circuit for generating and outputting a light-emission signal based on the detection signal;
    a light-emitting means for emitting visible light based on the light-emission signal;
    a detection portion on which the light-receiving means and the light-emitting means are arranged close together;
    a support for supporting the detection portion; and
    a driving means for moving the support in a reciprocative manner in an X axis direction and a Y axis direction to form a detection region with the detection portion, wherein
    the light-emitting means forms an afterimage on the detection region when the invisible light beam irradiates the detection region.

2. The light beam detection device as claimed in claim 1, wherein the driving means includes an X axis direction driving means for reciprocating the support in the X axis direction and a Y axis direction driving means for vibrating the support in the Y axis direction; and
    the detection region is adjustable in size with the X axis direction driving means and the Y axis direction driving means.

3. The light beam detection device as claimed in claim 1, wherein the light-emitting means has an emission brightness that is adjustable with the light detection circuit.

4. The light beam detection device as claimed in claim 1, wherein the light detection circuit generates a comparison voltage based on the detection signal and holds a peak voltage of the comparison voltage, generates a reference voltage based on the held peak voltage, and compares the comparison voltage with the reference voltage to generate and output the light-emission signal when the comparison voltage is higher than the reference voltage.

5. The light beam detection device as claimed in claim 1, wherein the support includes a supporting rod having a square cross section.

6. A light beam detection device that receives invisible light and emits visible light in response to the received invisible light, the device comprising:
    a light-receiving element for receiving an invisible light beam and outputting a detection signal;
    a light detection circuit for generating and outputting a light-emission signal based on the detection signal;

a light-emitting element for emitting visible light based on the light-emission signal;

a detection member on which the light-receiving element and the light-emitting element are arranged close together;

a supporting member for supporting the detection member; and a driving device for moving the supporting member in a reciprocative manner in an X axis direction and a Y axis direction to form a detection region with the detection member, wherein the light-emitting means forms an afterimage on the detection region when the invisible light beam irradiates the detection region.

7. The light beam detection device as claimed in claim 6, wherein the driving device includes an X axis direction driving device for reciprocating the supporting member in the X axis direction and a Y axis direction driving device for vibrating the support in the Y axis direction; and the detection region is adjustable in size with the X axis direction driving device and the Y axis direction driving device.

8. The light beam detection device as claimed in claim 6, wherein the light-emitting element has an emission brightness that is adjustable with the light detection circuit.

9. The light beam detection device as claimed in claim 6, wherein the light detection circuit generates a comparison voltage based on the detection signal and holds a peak voltage of the comparison voltage, generates a reference voltage based on the held peak voltage, and compares the comparison voltage with the reference voltage to generate and output the light-emission signal when the comparison voltage is higher than the reference voltage.

10. The light beam detection device as claimed in claim 6, wherein the supporting member includes a supporting rod having a square cross section.

* * * * *